D. V. BUCK.
RAIL JOINT.
APPLICATION FILED NOV. 28, 1910.

1,012,807.

Patented Dec. 26, 1911.
2 SHEETS—SHEET 1.

Witnesses
William C. Linton.
H. S. Austin.

Inventor
David V. Buck.

By Joshua R. H. Potts,
Attorney

D. V. BUCK.
RAIL JOINT.
APPLICATION FILED NOV. 28, 1910.

1,012,807.

Patented Dec. 26, 1911.

2 SHEETS—SHEET 2.

Witnesses
William C. Linton.

Inventor
David V. Buck.
By Joshua R. H. Potts.
Attorney

UNITED STATES PATENT OFFICE.

DAVID V. BUCK, OF NEW COLUMBIA, PENNSYLVANIA, ASSIGNOR OF ONE-HALF TO JAMES S. REITMEYER, OF NEW COLUMBIA, PENNSYLVANIA.

RAIL-JOINT.

1,012,807.

Specification of Letters Patent.

Patented Dec. 26, 1911.

Application filed November 28, 1910. Serial No. 594,472.

*To all whom it may concern:*

Be it known that I, DAVID V. BUCK, a citizen of the United States, residing at New Columbia, county of Union, and State of Pennsylvania, have invented certain new and useful Improvements in Rail - Joints, of which the following is a specification.

My invention relates to rail joints, that is, to devices for securing together the abutting ends of rails.

The object of my invention is to provide an improved rail joint which will firmly and securely hold the abutting ends of the rails and which may be assembled or removed without the use of bolts.

A further object of my invention is to provide a rail joint consisting of a pair of fish plates provided with interlocking portions adapted to be disengaged from each other by relative longitudinal movement and of such construction that the necessary longitudinal movement for separating the parts shall be reduced to a minimum.

Other objects will appear hereinafter.

My invention will be more readily understood by reference to the accompanying drawings forming a part of this specification and in which—

Figure 1:
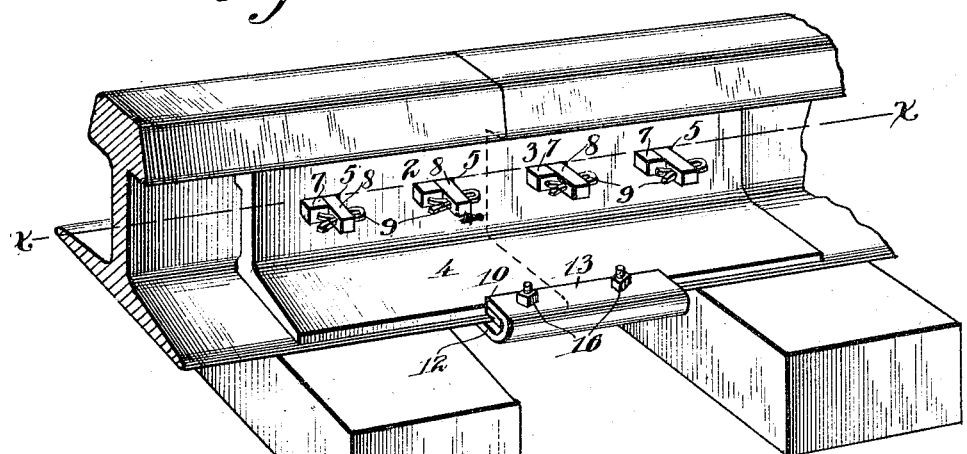
Figure 2:
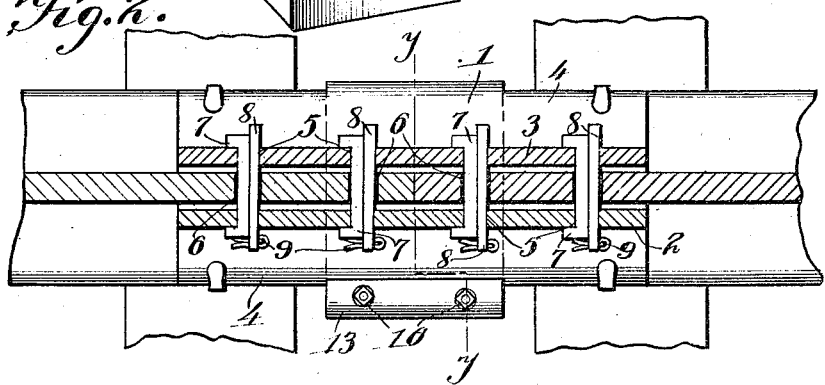
Figure 3:
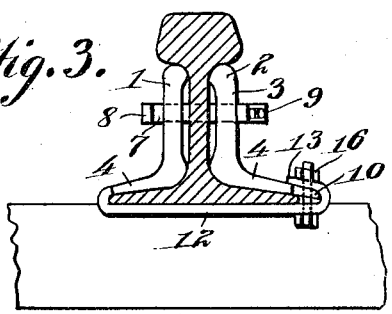
Figure 4:
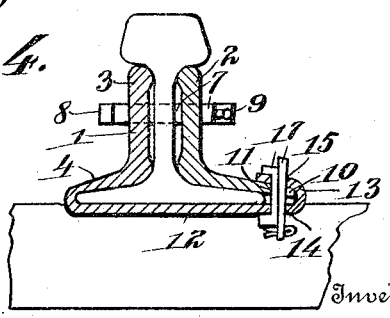
Figure 5:
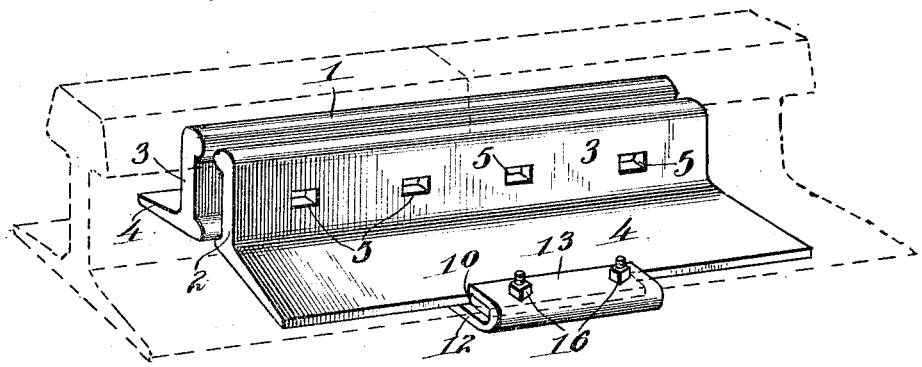
Figure 6:
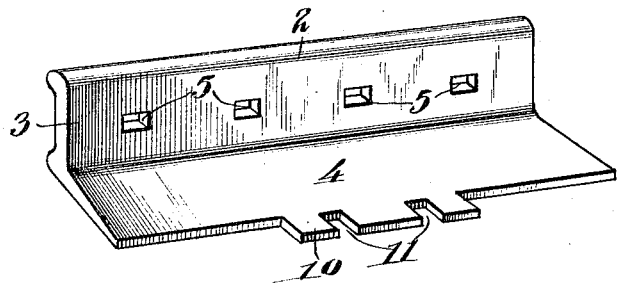
Figure 7:
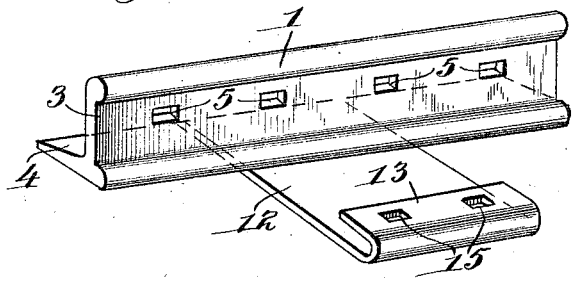

Figure 1 is a perspective view of a rail joint embodying my invention and illustrated applied to the ends of the rails, Fig. 2 is a horizontal section on substantially the line $x$—$x$ of Fig. 1, Fig. 3 is an end elevation of the device with the rail shown in section, Fig. 4 is a vertical transverse section on the line $y$—$y$ of Fig. 2, Fig. 5 is a view similar to Fig. 1, the rail being illustrated in dotted lines and the transverse fastening devices being removed, Fig. 6 is a perspective view of one of the members of the joint, and Fig. 7 is a perspective view of the other member.

My invention consists generally in a pair of elongated angle irons or fish plates adapted to be secured upon opposite sides of the rails and fit snugly against the web and flange portions thereof, and interlocking members on the fish plates.

Referring now to the drawings 1 and 2 indicate the fish plates respectively each comprising a vertical portion 3 to fit against the web of the rail between the ball and flange and a base portion 4 to rest upon the upper face of the rail flange. The portions 3 are provided with rectangular apertures 5 and the rails are provided with similar but slightly larger apertures 6. Extending through the apertures 5 and 6 are gibs 7 and cotters 8 for securing the fish plates to the rails. If preferred cotter pins 9 may be provided for holding the cotters 8 against displacement.

The base flange 4 of the fish plate 2 is provided with a centrally disposed extension 10 which is quite narrow in proportion to the length of the fish plate and provided with notches 11 for a purpose hereinafter described. Extending from the outer edge of the base flange 4 of the plate 1 is an elongated member 12. The member 12 is substantially the same width as the extension 10 and is bent back under the plate to fit snugly against the base of the rail flange as shown clearly in Figs. 3 and 4. The end of the member 12 is bent upwardly and inwardly forming a lip 13 which fits snugly over the extension 10, and the member 12 and lip 13 are provided with registering or vertically alined apertures 14 and 15 respectively which register with the notches 11 in the extension 10. The apertures 11, 14 and 15 are adapted to receive fastening means which may consist of bolts 16 as illustrated in Figs. 1, 2, 3, and 5, or cotters and gibs 17 as illustrated in Fig. 4.

In assembling the device the plate 1 is placed in position at one side of the abutting ends of the rails with the member 12 extending beneath the flanges thereof. The other fish plate 2 is placed upon the opposite side of the rails and moved longitudinally to insert the extension 10 under the lip 13. The fastening devices are then placed in position to secure the plates to the rails and the locking devices to each other. It is obvious that the plate 2 need only be moved a distance equal to the width of the extension 10 when assembling or removing the device which is found to be of greater convenience than if the locking members 10 and 12 extended the full length of the plate.

Having described my invention, what I claim as new and desire to secure by Letters Patent is:

In a rail joint, a pair of fish plates each comprising a web engaging portion and a flange engaging portion, the upper edges of said fish plates abutting under the ball of the rail, a centrally disposed extension projecting outwardly from the flange engaging portion of one of said plates and provided with notches in its outer end, a member extending centrally from the corresponding portion of the other plate and bent backwardly to extend under the flange of a rail, an upwardly and inwardly extending lip on the end of said member adapted to extend over said extension only on the first said plate, said extension and said member being of substantially the same width and of considerably less width than the length of the plates, said member, and said lip being provided with apertures adapted to register with said notches and fastening means extending through said apertures and notches, substantially as described.

In testimony whereof I have signed my name to this specification in the presence of subscribing witnesses.

DAVID V. BUCK.

Witnesses:
 JAMES S. REITMEYER,
 WILLIAM A. BUCK,
 RALPH L. BELFORD.